US012801536B2

(12) United States Patent
Zhang et al.

(10) Patent No.: US 12,801,536 B2
(45) Date of Patent: Nov. 17, 2026

(54) DATA ENCRYPTION AND DECRYPTION SYSTEM AND DATA ENCRYPTION AND DECRYPTION METHOD

(71) Applicant: RAYMX Microelectronics Corp., Anhui Province (CN)

(72) Inventors: Yu Zhang, Hefei City (CN); Yong-Peng Jing, Jiangsu Province (CN)

(73) Assignee: RAYMX MICROELECTRONICS CORP., Anhui Province (CN)

( * ) Notice: Subject to any disclaimer, the term of this patent is extended or adjusted under 35 U.S.C. 154(b) by 205 days.

(21) Appl. No.: 18/359,006

(22) Filed: Jul. 26, 2023

(65) Prior Publication Data

US 2024/0241837 A1 Jul. 18, 2024

(30) Foreign Application Priority Data

Jan. 16, 2023 (CN) ......................... 202310074893.3

(51) Int. Cl.
*G06F 12/14* (2006.01)
*G06F 11/10* (2006.01)

(52) U.S. Cl.
CPC ...... *G06F 12/1408* (2013.01); *G06F 11/1004* (2013.01)

(58) Field of Classification Search
CPC .. G06F 12/1408; G06F 11/1004; G06F 21/78; G06F 21/80
See application file for complete search history.

(56) References Cited

U.S. PATENT DOCUMENTS

2010/0115286 A1* 5/2010 Hawkes .............. G06F 12/1408 713/189
2012/0144277 A1* 6/2012 Lee ....................... H03M 13/09 713/193
2015/0169472 A1* 6/2015 Yap ..................... G06F 12/1408 713/190
2017/0063532 A1* 3/2017 Bhattacharyya ........ G06F 21/76
2021/0119780 A1* 4/2021 Hassan ................... H04L 9/088
2021/0165746 A1* 6/2021 Knezevic ................ G06F 21/78
2021/0312057 A1* 10/2021 Kloth .................... G06F 21/575
2024/0078017 A1* 3/2024 Adhinarayanan ... G06F 12/0811

FOREIGN PATENT DOCUMENTS

CN 102356418 A 2/2012
CN 114077383 A 2/2022

OTHER PUBLICATIONS

CN Office Action dated Jul. 27, 2026 in Chinese application No. 202310074893.3.

* cited by examiner

*Primary Examiner* — Matthew T Henning
(74) *Attorney, Agent, or Firm* — McClure, Qualey & Rodack, LLP

(57) ABSTRACT

A data encryption and decryption system (and associated method) includes a memory controlling circuit and an encryption and decryption circuit. In write operation, the encryption and decryption circuit executes an encryption algorithm on a write address to obtain first seed data, executes a first scrambling process on initial write data to generate first scrambled data, and executes a second scrambling process on the first scrambled data according to common seed data, so as to generate encrypted write data. The memory controlling circuit writes the encrypted write data into a memory unit according to the write address.

18 Claims, 5 Drawing Sheets

DATA ENCRYPTION AND DECRYPTION SYSTEM AND DATA ENCRYPTION AND DECRYPTION METHOD

CROSS-REFERENCE TO RELATED PATENT APPLICATION

This application claims the benefit of priority to Taiwan Patent Application No. 202310074893.3, filed on Jan. 16, 2023 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system and a method, and more particularly to a data encryption and decryption system and a data encryption and decryption method.

BACKGROUND OF THE DISCLOSURE

Certain important and rarely modified data in a system, such as code for bootloaders and kernels, can be stored in the existing memory with non-volatile characteristic e.g., serial peripheral interface (SPI) flash memory. By disassembling circuits of the memory and directly reading memory signals, non-encrypted data may be stolen by unscrupulous individuals. Therefore, it is necessary to design a corresponding encryption and decryption mechanism to protect against such occurrences.

However, poorly designed encryption and decryption mechanisms may result in complex circuits that occupy large areas, and require a long time for reading or writing on the memory. However, an oversimplified encryption and decryption mechanism can also leave security vulnerabilities.

Therefore, how to strike an optimal balance between the speed of encryption and decryption and the security of data to avoid increasing of the time complexity for reading or writing operations has become one of the important issues in the related art.

SUMMARY OF THE DISCLOSURE

In response to the above-referenced technical inadequacies, the present disclosure provides a data encryption and decryption system and a data encryption and decryption method capable of balancing encryption and decryption speed and data security.

In one aspect, the present disclosure provides a data encryption and decryption system, which includes a memory controlling circuit and an encryption and decryption circuit. The memory controlling circuit is coupled to a memory unit, and is configured to access the memory unit according to a write operation from a host, and the write operation comprises an initial write data and a write address. The encryption and decryption circuit is coupled to the memory controlling circuit, and is configured to execute an encryption algorithm on the write address to obtain first seed data, execute a first scrambling process on the initial write data according to the first seed data to generate first scrambled data, and execute a second scrambling process on the first scrambled data according to common seed data, so as to generate encrypted write data. The memory controlling circuit is configured to write the encrypted write data into the memory unit according to the write address.

Preferably, the memory unit is a serial peripheral interface (SPI) flash memory, and the memory controlling circuit is an SPI flash memory controlling circuit coupled to the host through an advanced extensible interface (AXI).

In another aspect, the present disclosure provides a data encryption and decryption method applicable to a data access system including a memory controlling circuit and a memory unit. The data encryption and decryption method includes: executing a write operation, including: receiving an initial write data and a write address output by a host; executing an encryption algorithm on the write address to obtain first seed data, executing a first scrambling process on the initial write data according to the first seed data to generate a first scrambled data, and executing a second scrambling process on the first scrambled data according to common seed data to generate encrypted write data; and writing the encrypted write data into the memory unit according to the write address signal by the memory controlling circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
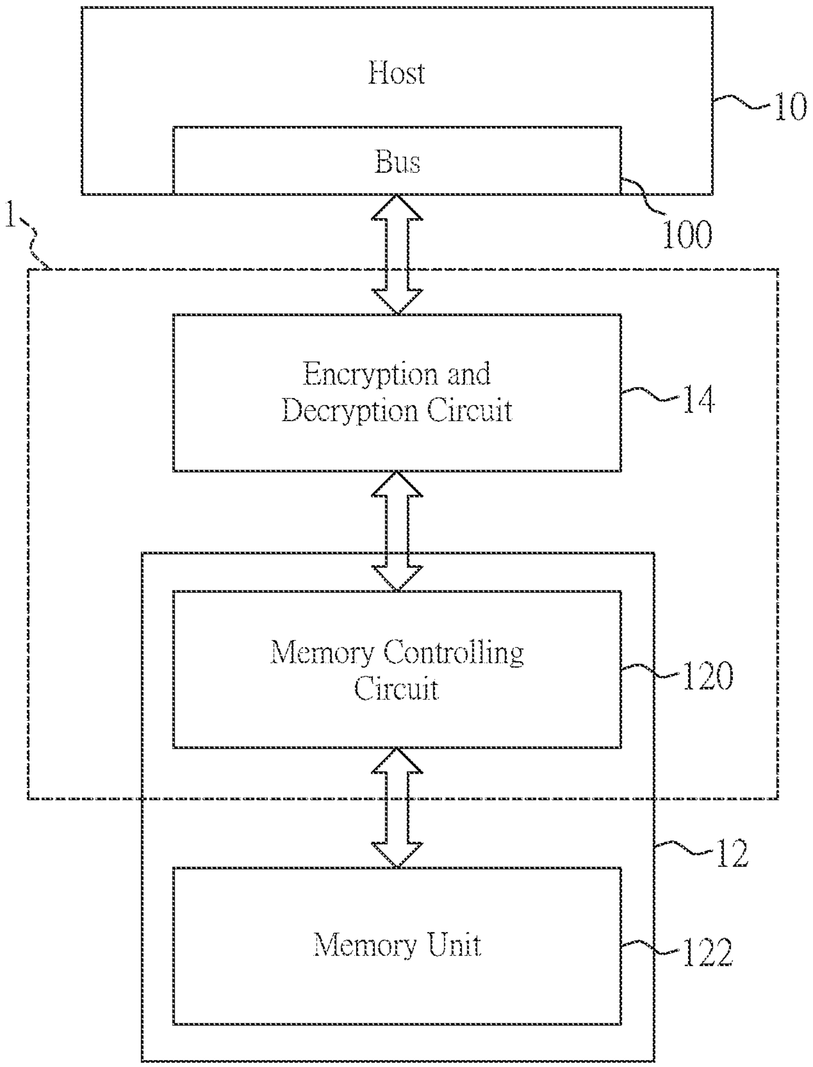
FIG. 1 is a functional block diagram of a data encryption and decryption system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a data encryption and decryption system according to one embodiment of the present disclosure. Reference is made to FIG. 1, one embodiment of the present disclosure provides a data encryption and decryption system 1, which includes a memory controlling circuit 120 and an encryption and decryption circuit 14. The host 10 can be coupled to the memory module 12 through a bus 100, and the encryption and decryption circuit 14 is coupled between the host 10 and the memory module 12. The memory module 12 can be a data access system that includes a memory controlling circuit 120 and a memory unit 122.

The bus 100 can be, for example, an advanced eXtensible interface (AXI) bus, but the present disclosure is not limited thereto, and the bus 100 can also be other types of bus. It should be noted that the AXI bus is a high-performance bus standard in advanced microcontroller bus architecture (AMBA), and read/write request signals and the read/write result signals can be separated from each other. Such a bus can execute at high frequency and achieve high data throughput while in the high latency condition. In the embodiment of the present disclosure, when the bus 100 is implemented with an AXI bus, since the read/write request signals and the read/write result signals can be separated from each other to divide data writing and data reading signals, write and read operations can be performed simultaneously, thereby maximizing the data throughput of the bus. It should be noted that the data encryption and decryption system and data encryption and decryption method provided by the present disclosure are suitable for an architecture in which the read/write request signals and the read/write result signals are separated from each other, and can ensure the speeds of encryption and decryption to avoid increasing the time required for reading or writing.

In some embodiments, the memory unit 122 is a non-volatile memory, which is structured for long-term storage of instructions and/or data, such as NAND or NOR flash memory, or some other suitable non-volatile memory. In one embodiment, the memory unit 122 is NAND or NOR flash memory, the memory module 12 is a flash memory device (e.g., a flash memory card), and the memory controlling circuit 120 is a flash memory controller. For example, in certain cases, the memory module 12 is an SPI device, the memory unit 122 may be NOR or NAND flash memory, however, the present disclosure is not limited thereto. It should be noted that the technique provided in the present disclosure can also be applied to other types of non-volatile memory devices, such as phase-change memory (PCM) and various types of main memory or cache memory devices, such as static random access memory (SRAM), dynamic random access memory (DRAM), variable resistance memory (ReRAM) or magnetoresistive random-access memory (MRAM).

An example of a NOR flash memory that uses an AXI bus as the memory unit 122 is described hereinafter. The memory controlling circuit 120 can be, for example, a general purpose microprocessor or a special purpose microcontroller that can be configured to manage access to and operation of the memory unit 122.

In some embodiments, the host 10 can generate commands for executing access operations, for example, memory commands indicating to perform write operations or read operations. The host 10 can send the memory commands to the memory controlling circuit 120 through the bus 100, the memory controlling circuit 120 then accesses the memory unit 122 according to the access operations (e.g., including write and read operations) indicated by the memory commands from the host 10. The memory commands can include read, program, write, and erase commands.

However, in the architecture of the embodiment of the present disclosure, when the memory command is sent to the memory controlling circuit 120, the memory command will first enter the encryption and decryption circuit 14, which is configured to encrypt and decrypt signals transmitted between the host 10 and the memory module 12. It should be noted that input and output signals that pass through the encryption and decryption circuit 14 follow the AXI protocol and do not affect a protocol handshake of the memory controlling circuit 120 of the SPI, which is convenient for system integration.

Figure 2:
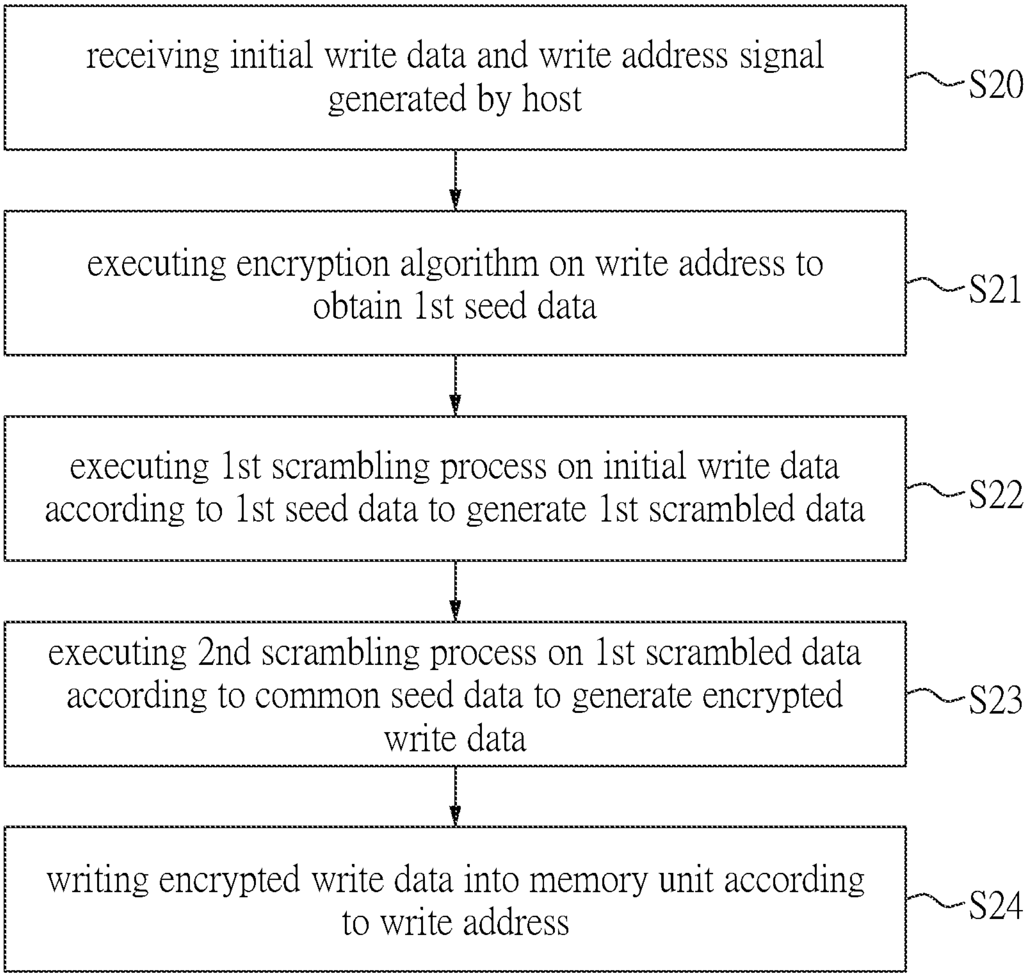
FIG. 2 is a flowchart of a writing operation of the data encryption and decryption method according to one embodiment of the present disclosure.
Figure 3:
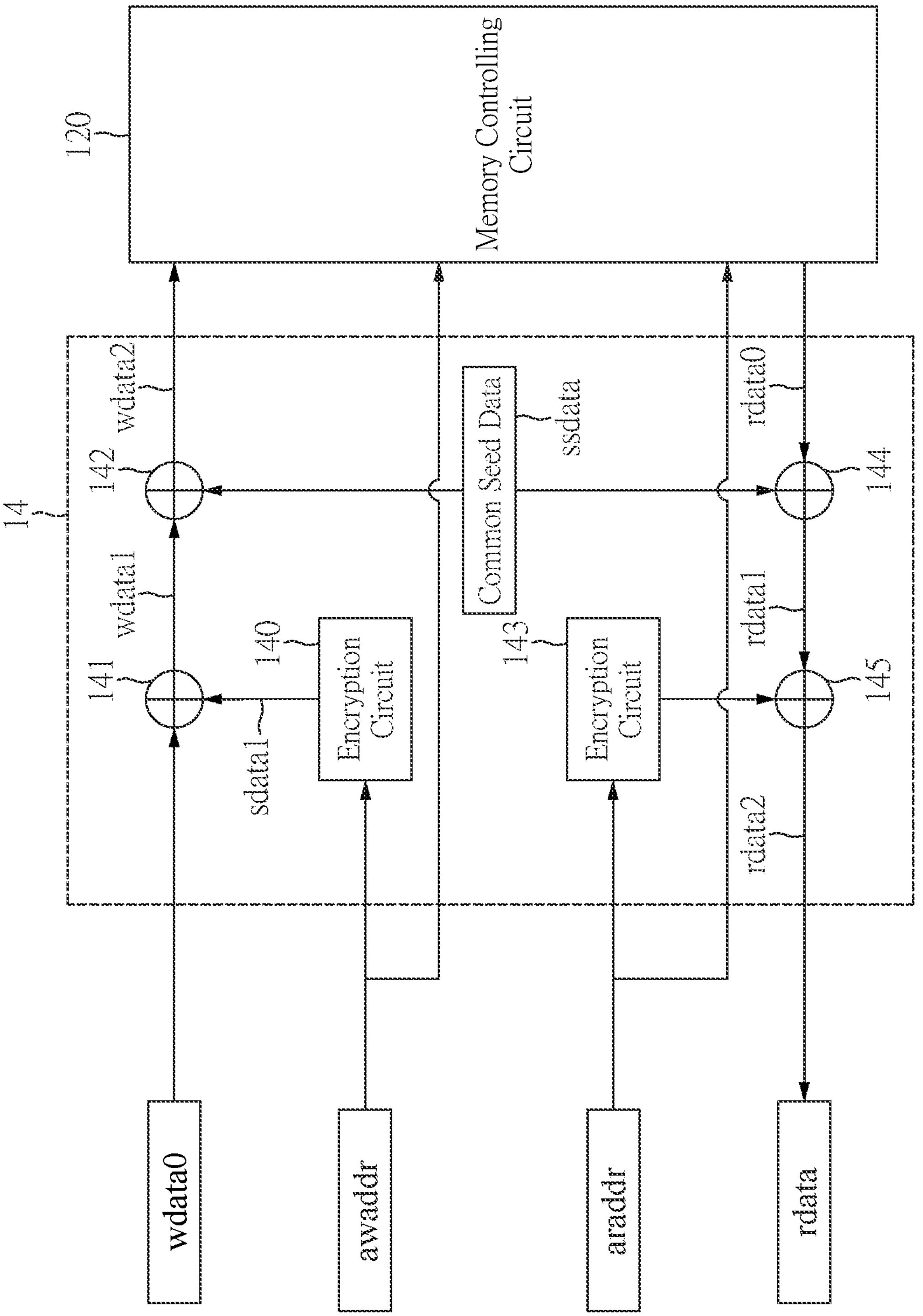
FIG. 3 is a schematic signal diagram showing an encryption and decryption circuit executing read and write operations according to one embodiment of the present disclosure.

Reference is made to FIGS. 2 and 3, FIG. 2 is a flowchart of a writing operation of the data encryption and decryption method according to one embodiment of the present disclosure, and FIG. 3 is a schematic signal diagram showing an encryption and decryption circuit executing read and write operations according to one embodiment of the present disclosure.

As shown in FIGS. 2 and 3, the data encryption and decryption method provided by the present disclosure includes executing a write operation, in which the following steps are performed:

Step S20: receiving initial write data and a write address generated by the host.

For example, the host 10 can include a processor configured to generate data to be stored in the memory module 12, and generate an initial write data signal wdata0 (including the initial write data) and a write address signal awaddr (including the write address) according to a predetermined location to be written. For example, when the memory command is a write operation command, the memory command can include an address field with one or more address bytes, which specify a memory address on which the write operation is executed. For the memory command corresponding to the write operation, the memory command further includes a data field with one or more bytes of data to be written.

Step S21: executing an encryption algorithm on the write address to obtain first seed data. For example, the encryption and decryption circuit 14 can be used to execute step S21, and can include an encryption circuit 140 for executing the encryption algorithm. In this step, the encryption algorithm can be, for example, a cyclic redundancy check (CRC) algorithm, such that the encryption circuit 140 can be, for example, a CRC encoder. Since each record of data to be written corresponds to a unique access address, unique first sub-data sdata1 can be obtained by executing the CRC check algorithm on the write address of the write address signal awaddr. Since the memory unit 122 has a plurality of storage blocks corresponding to a plurality of memory addresses, and the plurality of memory addresses are respectively used to generate different and unique records of first seed data Sdata1 in the write operation; therefore, the encryption mechanism implemented for the different memory addresses are unique.

Step S22: executing a first scrambling process on the initial write data according to the first seed data to generate first scrambled data. For example, the encryption and decryption circuit 14 can be used to execute step S22, and can include a first scrambling circuit 141 for executing the first scrambling process. In this step, the first scrambling process can be, for example, an exclusive-or (XOR) algorithm, and thus the first scrambling circuit 141 can be, for example, a simple exclusive-or logic circuit, that is, an XOR gate. In this embodiment, the first scrambling circuit 141 is used to perform an XOR operation on the initial write data of the initial write data signal wdata0 according to the first seed data sdata1, so as to generate a first write data signal wdata1 with the first scrambled data in a high security level.

Step S23: executing a second scrambling process on the first scrambled data according to common seed data to generate encrypted write data. For example, the encryption and decryption circuit 14 can also be used to execute step S23, and can include a second scrambling circuit 142 for executing the second scrambling process. In this step, the second scrambling process can also be, for example, the XOR algorithm, and thus the second scrambling circuit 142 can be, for example, a simple exclusive-or logic circuit, that is, another XOR gate. In this embodiment, the common seed data is unique firmware seed data, which can be provided by suppliers while delivering products of the memory module 12.

Therefore, in order to increase level of data scrambling, the second scrambling circuit 142 can be utilized to execute another XOR operation on the first scrambled data of the first write data signal wdata1, thereby increasing the security level of the encrypted write data of the encrypted write data signal wdata2 again. The second scrambling circuit 142 can also be used to construct the above-mentioned reversible characteristics to achieve the mechanism of encryption and decryption.

Step S24: writing the encrypted write data into the memory unit according to the write address signal. In step S24, the memory controlling circuit 120 can write the encrypted write data of an encrypted write data signal wdata2 into the memory unit 122 according to the write address, and the data finally written into the memory unit 122 by the memory controlling circuit 120 is encrypted twice. Since the first seed data Sdata1 used to execute the scrambling process generated by each address is different, a difficulty of restoring the initial data obtained through disassembly can be greatly increased.

Figure 4:
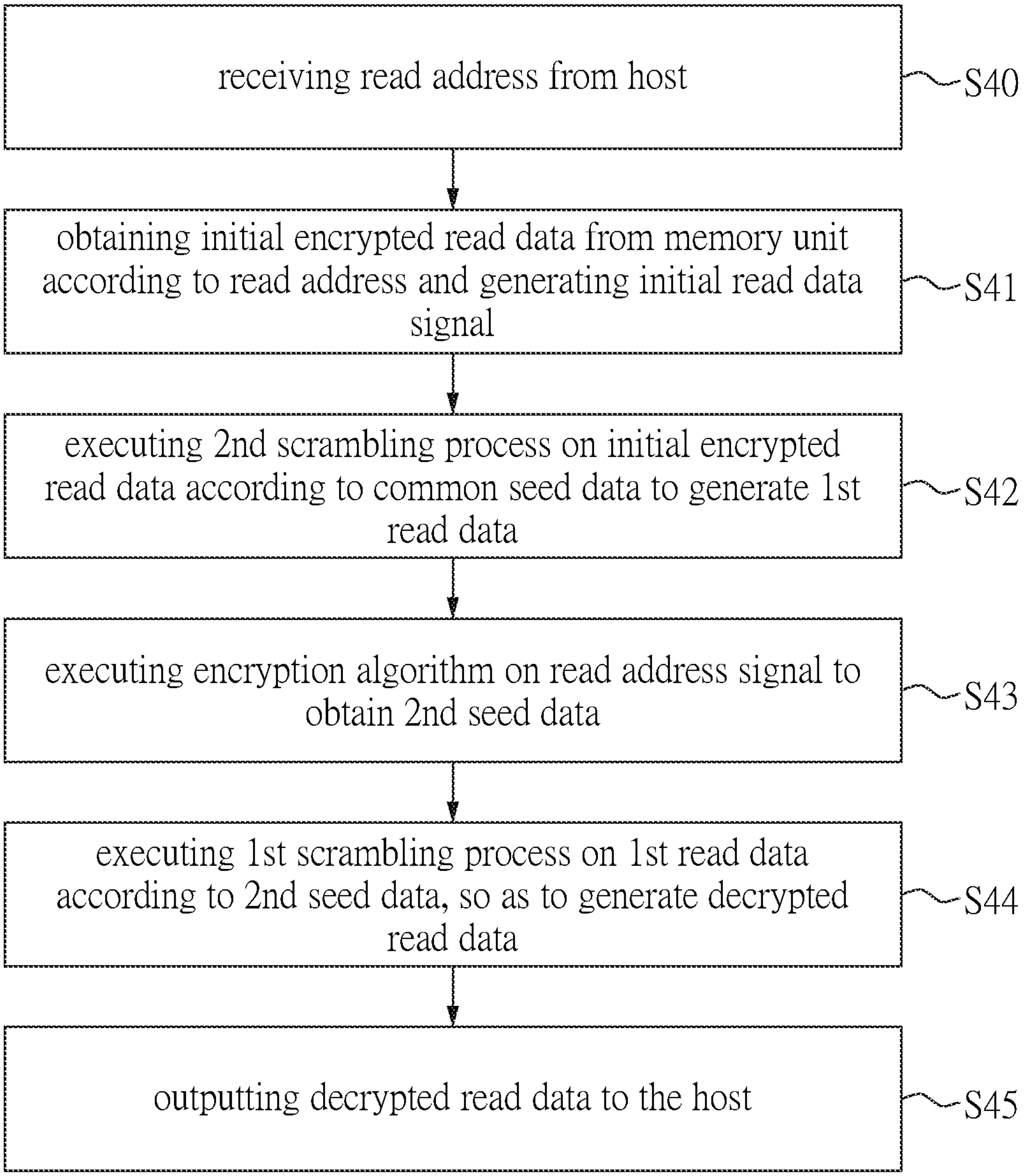
FIG. 4 is a flowchart of the read operation of the data encryption and decryption method according to one embodiment of the present disclosure.

Reference is made to FIG. 4, which is a flowchart of the read operation of the data encryption and decryption method according to one embodiment of the present disclosure. As shown in FIGS. 3 and 4, the data encryption and decryption method provided by the present disclosure further includes executing the read operation, in which the following steps are performed:

Step S40: receiving a read address from the host.

For example, the processor of the host 10 can generate a predetermined location where data is to be read from the memory module 12, and accordingly generate a read address signal araddr. The read address signal araddr can be sent to the memory controlling circuit 12 and the encryption and decryption circuit 14. For example, when the memory command is a read operation command, the memory command can include an address field with one or more address bytes, which specify a memory address on which the read operation is executed.

Step S41: obtaining initial encrypted read data from the memory unit according to the read address signal and generating an initial read data signal. In step S41, when the memory controlling circuit 120 receives the read address signal araddr, the memory controlling circuit 120 fetches data according to the read address indicated by the read address signal araddr and generates an initial read data signal rdata0 with the initial encrypted read data. It should be noted that if the memory address indicated by the read address signal araddr is the same as that indicated by the write address signal awaddr mentioned in the foregoing embodiment, the initial encrypted read data of the initial read data signal rdata0 and the encrypted write data of the encrypted write data signal wdata2 can be the same.

Step S42: executing the second scrambling process on the initial encrypted read data according to the common seed data to generate first read data. Similar to the second scrambling circuit 142, the encryption and decryption circuit 14 can be used to execute step S42, and can include a third scrambling circuit 144 for executing the second scrambling process. In this step, the third scrambling circuit 144 can also be, for example, a simple XOR logic circuit, that is, yet another XOR gate. In the present embodiment, when the XOR operation is performed on the initial encrypted read data of the initial read data signal rdata0 again according to the common seed data ssdata, so as to obtain a first read data signal rdata1 having the first read data being the same as the first scrambled data (under the premise of having the same address), and the mechanism can be expressed by the following equation (1):

$$A \text{ xor } B \text{ xor } B = A \quad \text{equation (1);}$$

It can be seen from equation (1) that the characteristic of the used XOR operation can guarantee the reversible characteristics of the data, and such reversible characteristics can be further utilized to provide a decryption mechanism. In other embodiments of the present disclosure, one or more groups of the common seed data ssdata can be provided, for example, multiple access addresses of the memory unit 122 can be grouped, and different common seed data ssdata can be given to different groups, such that the security of data can be further improved.

Step S43: executing an encryption algorithm on the read address to obtain the second seed data. Similar to the encryption circuit 140, the encryption and decryption circuit 14 can be used to execute step S43, and can include an encryption circuit 143 for executing an encryption algorithm on the read address of the read address signal araddr. In this step, the encryption algorithm can also be, for example, a CRC check algorithm, and thus the encryption circuit 143 can also be, for example, a CRC encoder. Since each read command corresponds to a unique access address, unique second seed data sdata2 can be obtained by executing the CRC check algorithm on the read address of the read address signal araddr. Therefore, in a case where the read address is the same as the write address, the corresponding first sub-data sdata1 and second seed data sdata2 are the same.

Similarly, since the memory addresses of the memory unit 122 are respectively used to generate different and unique records of the second seed data Sdata2 in the read operation, the decryption mechanism implemented for the different memory addresses are also unique.

Step S44: executing the first scrambling process on the first read data according to the second seed data, so as to generate decrypted read data. Step S44 can be executed by configuring the encryption and decryption circuit 14. Similar to the first scrambling circuit 141, the encryption and decryption circuit 14 can also include a fourth scrambling circuit 145 for executing the first scrambling process. In this step, the fourth scrambling circuit 145 can also be, for example, a simple XOR logic circuit, that is, yet another XOR gate. In the present embodiment, when the XOR operation is performed again according to the common seed data ssdata, a second read data signal rdata2 having the decrypted read data that is as the same as the first read data of the first read data signal rdata1 can be obtained (under the premise of having the same address).

Step S45: outputting decrypted read data to the host.

After the above steps are performed, the encryption and decryption circuit 14 can send the second read data signal rdata2 with the decrypted read data to the host 10, and the host 10 can finally obtain the initial data corresponding to the encrypted read data in the memory unit 122 by receiving the second read data signal rdata2. Furthermore, since the second seed data Sdata2 used to execute the scrambling process generated by each address is different, a difficulty of restoring the initial data obtained through disassembly can be greatly increased. Moreover, one special mechanism of the present disclosure is that, rather than directly using the decryption circuit and decryption algorithm, multiple scrambling circuits are utilized to construct the reversible characteristics, thereby achieving the mechanism of encryption and decryption.

It should be noted that if the memory address indicated by the read address signal araddr is the same as that indicated by the write address signal awaddr mentioned in the foregoing embodiment, the second read data signal rdata2 with the decrypted read data generated in the read operation after the write operation and the initial write data signal wdata0 have the same data.

Figure 5:
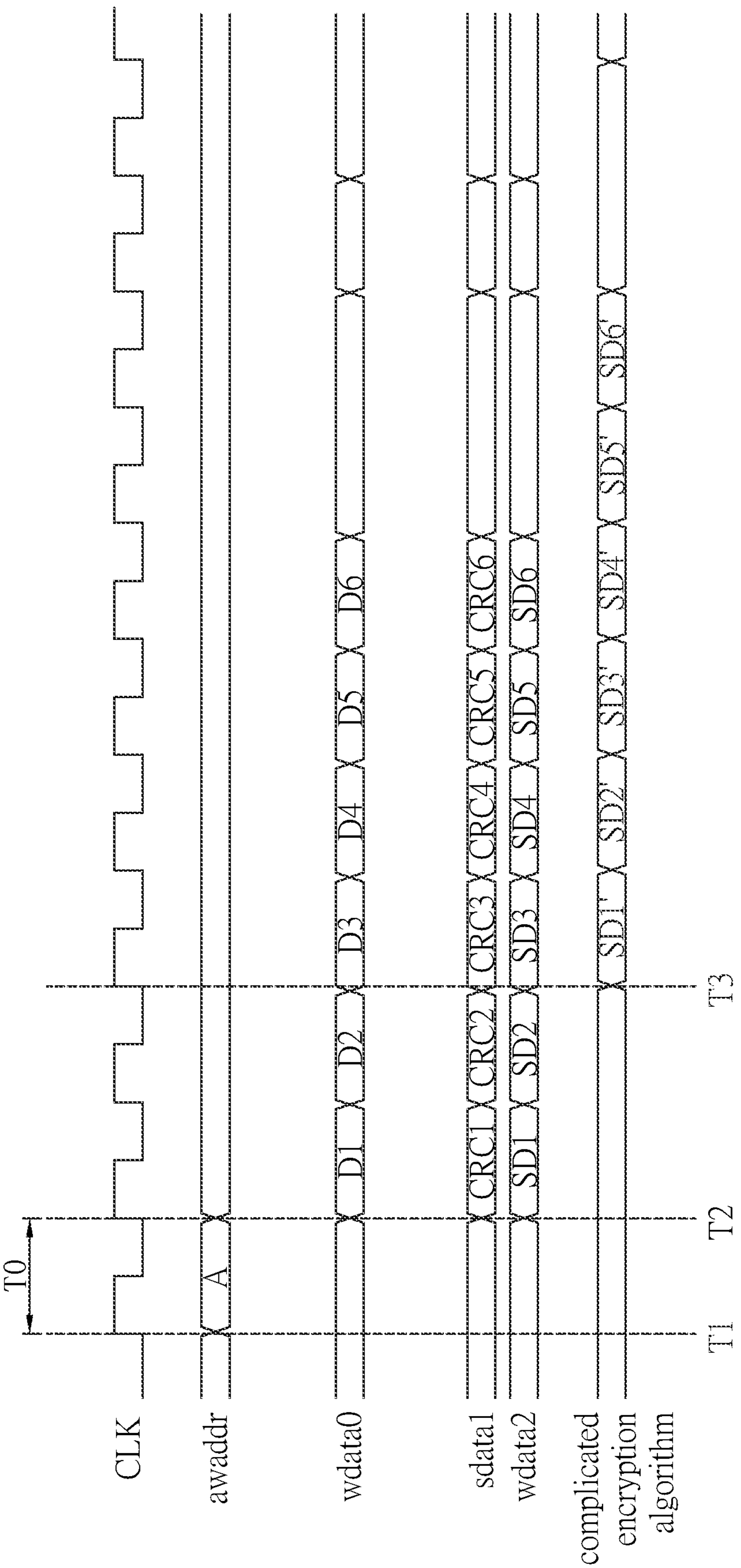
FIG. 5 is a signal timing diagram of the write operation executed by the data encryption and decryption method according to one embodiment of the present disclosure.

Reference is made to FIG. 5, which is a signal timing diagram of the write operation executed by the data encryption and decryption method according to one embodiment of the present disclosure. It should be noted that since the host 10 can be coupled to the memory module 12 through the bus 100, the host 10 and the memory module 12 need to perform write operations and read operations according to a communication protocol compatible with the bus 100 and a system clock signal CLK. For example, when the bus 100 is implemented by the AXI bus, the host 10 and the memory module 12 operate according to the AXI protocol. As shown in FIG. 5, the system clock signal CLK has a predetermined period TO. Between time T1 and T2, the host 10 generates the write address signal awaddr, and transmits the initial write data signal wdata 0 including write data D1 to D6 at time T2. Since circuit structures of the encryption circuit 140, the first scrambling circuit 141 and the second scrambling circuit 142 are simple and have fast response speeds, after the encryption circuit 140 of the encryption and decryption circuit 14 receives the write address signal awaddr of the host computer 10, the encryption algorithm, the first scrambling process and the second scrambling process can be executed to generate the first seed signal Sdata1 (including CRC encrypted data CRC1 to CRC6) and the encrypted write data signal wdata2 within a predetermined cycle T0 (time T1 to T2), in which the encrypted write data signal wdata2 has encrypted data SD1 to SD6 corresponding to the written data D1 to D6. Therefore, the data encryption and decryption method provided by the present disclosure can greatly improve the security and confidentiality of the system without affecting original data transmission rate of the bus for the memory.

However, for a more complicated encryption algorithm, the encrypted data SD1' to SD6' corresponding to the written data D1 to D6 may be obtained after a plurality of predetermined periods T0, for example, time T3 as shown in FIG. 5, and it is obviously impossible to match timings of the system clock signal CLK and the corresponding memory write operation under the AXI protocol.

In conclusion, compared with the existing encryption and decryption system and data encryption and decryption method, the data encryption and decryption system and data encryption and decryption method provided by the present disclosure can execute the encryption algorithm and two scrambling processes based on the uniqueness of the read addresses and write addresses, which can effectively prevent the data in the memory from being stolen while balancing encryption and decryption speed with security. Therefore, the security of the related on-chip system can be improved, and the encryption mechanism provided by the present disclosure can be easily applied to different types of storage devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A data encryption and decryption system, comprising:

a memory controlling circuit coupled to a memory unit, wherein the memory controlling circuit is configured to access the memory unit according to a write operation from a host, and the write operation comprises an initial write data and a write address, wherein the write address comprises an address field with at least one address bytes that specifies a memory address on which the write operation is executed, such that encryptions implemented for different memory addresses are unique, such that encryption performed on first initial write data stored at any memory address is different than encryption performed on the first initial write data stored at any other memory addresses; and an encryption and decryption circuit, coupled to the memory controlling circuit, wherein the encryption and decryption circuit is configured to execute an encryption algorithm on the write address to obtain first seed data, execute a first scrambling process on the initial write data according to the first seed data to generate first scrambled data, and execute a second scrambling process on the first scrambled data according to common seed data, so as to generate encrypted write data, wherein the second scrambling process is performed a same number of times as the first scrambling process;

wherein the memory controlling circuit is configured to write the encrypted write data into the memory unit according to the write address, wherein the encrypting algorithm is a cyclic redundancy check (CRC) algorithm, where the encryption and decryption circuit includes a CRC encoder.

2. The data encryption and decryption system according to claim 1, wherein the memory controlling circuit is configured to receive a read address of a read operation generated by the host, and obtain initial encrypted read data from the memory unit according to the read address; and the encryption and decryption circuit is configured to:

execute the second scrambling process on the initial encrypted read data according to the common seed data to generate first read data;

execute the encryption algorithm on the read address to obtain second seed data;

execute the first scrambling process on the first read data according to the second seed data to generate decrypted read data; and output the decrypted read data to the host.

3. The data encryption and decryption system according to claim 2, wherein, in response to the memory address indicated by the read address and the write address being the same, the decrypted read data generated in the read operation that is performed after the write operation is the same as the initial write data.

4. The data encryption and decryption system according to claim 2, wherein the host and the data encryption and decryption system are configured to jointly execute the writing operation and the reading operation according to a communication protocol and a system frequency signal; and wherein, the system frequency signal has a predetermined period, and the encryption algorithm, the first scrambling process and the second scrambling process are executed within the predetermined period corresponding to the system frequency signal.

5. The data encryption and decryption system according to claim 2, wherein the memory unit has a plurality of blocks corresponding to a plurality of memory addresses, respectively, and the plurality of memory addresses are respectively used to generate different and unique records of first seed data in the write operation, and are respectively used to generate different and unique records of the second seed data in the read operation.

6. The data encryption and decryption system according to claim 1, wherein the memory unit is a serial peripheral interface (SPI) flash memory, and the memory controlling circuit is an SPI flash memory controlling circuit coupled to the host through an advanced extensible interface (AXI).

7. The data encryption and decryption system according to claim 1, wherein the first scrambling process is a first XOR algorithm, and the second scrambling process is a second XOR algorithm.

8. The data encryption and decryption system according to claim 1, wherein the common seed data is unique firmware seed data.

9. The data encryption and decryption system according to claim 1, wherein the host and the memory controlling circuit operate according to a bus protocol, and the encrypted write data is generated that complies with a timing of the bus protocol.

10. A data encryption and decryption method, applicable to a data access system including a memory controlling circuit and a memory unit, and the data encryption and decryption method comprising:

executing a write operation, including:

receiving initial write data and a write address output by a host, wherein the write address comprises an address field with at least one address bytes that specifies a memory address on which the write operation is executed, such that encryptions implemented for different memory addresses are unique, such that encryption performed on first initial write data stored at any memory address is different than encryption performed on the first initial write data stored at any other memory addresses;

executing an encryption algorithm on the write address to obtain first seed data, executing a first scrambling process on the initial write data according to the first seed data to generate first scrambled data, and executing a second scrambling process on the first scrambled data according to common seed data to generate encrypted write data, wherein the second scrambling process is performed a same number of times as the first scrambling process; and writing the encrypted write data into the memory unit according to the write address by the memory controlling circuit, wherein the encrypting algorithm is a cyclic redundancy check (CRC) algorithm, where an encryption and decryption circuit of the memory controlling circuit includes a CRC encoder.

11. The data encryption and decryption method according to claim 10, further comprising:

executing a read operation, including:

receiving a read address of the read operation output from the host;

obtaining initial encrypted read data from the memory unit according to the read address;

executing the second scrambling process on the initial encrypted read data according to the common seed data to generate first read data, executing the encryption algorithm on the read address to obtain second seed data, and executing the first scrambling process on the first read data according to the second seed data to generate decrypted read data; and outputting the decrypted read data to the host.

12. The data encryption and decryption method according to claim 11, wherein, in response to the memory address indicated by the read address and the write address being the same, the first seed data is the same as the second seed data, the decrypted read data generated in the read operation that is performed after the write operation is the same as the initial write data.

13. The data encryption and decryption method according to claim 11, wherein the host and the data access system are configured to jointly execute the write operation and the read operation jointly according to a communication protocol and a system clock signal;

wherein, the system frequency signal has a predetermined period, and the encryption algorithm, the first scrambling process and the second scrambling process are executed within the predetermined period corresponding to the system frequency signal.

14. The data encryption and decryption method according to claim 11, wherein the memory unit has a plurality of storage blocks corresponding to a plurality of memory addresses, respectively, and the plurality of memory addresses are respectively used to generate different and unique records of first seed data in the write operation, and are respectively used to generate different and unique records of the second seed data in the read operation.

15. The data encryption and decryption method according to claim 10, wherein the first scrambling process is a first XOR algorithm, and the second scrambling process is a second XOR algorithm.

16. The data encryption and decryption method according to claim 10, wherein the host and the memory controlling circuit operate according to a bus protocol, the encrypted write data is generated that complies with a timing of the bus protocol.

17. A data encryption and decryption method, applicable to a data access system including a memory controlling circuit and a memory unit, and the data encryption and decryption method comprising:

executing a read operation, including:

receiving a read address of the read operation output from a host, wherein the read address comprises an address field with at least one address bytes that specifies a memory address on which the read operation is executed, such that encryptions implemented for different memory addresses are unique, such that encryption performed on first initial write data stored at any memory address is different than encryption performed on the first initial write data stored at any other memory addresses;

obtaining encrypted read data from the memory unit according to the read address;

executing a second scrambling process on the encrypted read data according to a common seed data to generate first read data;

executing the encryption algorithm on the read address to obtain second seed data; and executing a first scrambling process on the first read data according to the second seed data to generate decrypted read data, wherein the first scrambling process is performed a same number of times as the second scrambling process; and outputting the decrypted read data to the host, wherein the encrypting algorithm is a cyclic check (CRC) algorithm, where an encryption and decryption circuit of the memory controlling circuit includes a CRC encoder.

18. The data encryption and decryption method according to claim 17, wherein the host and the memory controlling circuit operate according to a bus protocol, and the decrypted read data is generated that complies with a timing of the bus protocol.

* * * * *